(12) United States Patent
Rozsa

(10) Patent No.: US 6,407,390 B1
(45) Date of Patent: Jun. 18, 2002

(54) TEMPERATURE COMPENSATED SCINTILLATION DETECTOR AND METHOD

(75) Inventor: Csaba M. Rozsa, Brecksville, OH (US)

(73) Assignee: Saint-Gobain Industrial Ceramics, Inc., Worcester, MA (US)

( * ) Notice: Subject to any disclaimer, the term of this patent is extended or adjusted under 35 U.S.C. 154(b) by 0 days.

(21) Appl. No.: 09/536,197

(22) Filed: Mar. 27, 2000

(51) Int. Cl.[7] .............................. G01T 1/20; G01T 1/24
(52) U.S. Cl. .............................. 250/363.01; 250/370.11; 250/370.15
(58) Field of Search ................... 250/363.01, 370.11, 250/370.15

(56) References Cited

U.S. PATENT DOCUMENTS

| | | | | |
|---|---|---|---|---|
| 5,291,021 A | * | 3/1994 | Tanaka et al. | 250/363.03 |
| 5,532,489 A | * | 7/1996 | Yamashita et al. | 250/363.03 |
| 5,596,198 A | * | 1/1997 | Perez-Mendez | 250/370.11 |
| 6,087,656 A | * | 7/2000 | Kimmich et al. | 250/252.1 |

* cited by examiner

*Primary Examiner*—Ricky Mack
(74) *Attorney, Agent, or Firm*—Volker R. Ulbrich; Don W. Bulson

(57) ABSTRACT

A scintillation detector having reduced temperature sensitivity is provided by having two circuits for temperature compensation. The two circuits may be a thermistor in parallel with both a resistive element and a switching element. The switching element can be various devices including a zener diode, a Schottky barrier diode or an MIM. The temperature compensation circuit may be included in the circuit of a photo-detector such as a photomultiplier tube.

37 Claims, 10 Drawing Sheets

TEMPERATURE COMPENSATED SCINTILLATION DETECTOR AND METHOD

The invention herein described relates generally to a scintillation detector and more particularly to a circuit and method for temperature compensating temperature dependent components of a scintillation detector.

BACKGROUND OF THE INVENTION

Scintillation detectors have been employed in several fields such as the oil and gas industry for well logging, in the nuclear industry for radiation detection, as well as in many other industries. A typical scintillation detector employs a scintillator, such as NaI(Tl), and a photo-detector, such as a photomultiplier tube (PMT), for detecting ionizing radiation, e.g., x-rays, gamma rays and particles such as electrons and alpha particles.

The response of the aforesaid scintillation detector usually is temperature dependent, i.e., varies as the ambient temperature changes. This temperature dependence is primarily the result of the scintillator and the PMT being temperature dependent. For example, the scintillation light yield of a NaI(Tl) crystal changes with temperature at a rate of about −0.3% per °C., and the gain of a bialkali PMT changes with temperature at a rate of about −0.4% per °C. Thus, a scintillation detector comprised of a NaI(Tl) crystal and a bialkali PMT can have a total pulse height change of about 40% for a temperature change of 60° C. (from 0° C. to 60° C.). This means that in a scintillation detector that is doing gross counting and experiencing a 60° C. temperature change, a count of 100 times at 0° C. would occur for every 60 times at 60° C. In a system that is doing spectroscopy, the spectral peaks will shift in position. This broadens the peak widths causing movement of the peaks to the wrong spectral locations or complete loss of the peaks due to smearing.

This temperature dependency may or may not be acceptable according to the application for which the scintillation detector is to be used. For those applications where the temperature dependent variation in the signal is disadvantageous or unacceptable, prior art solutions have relied on active real time hardware and/or software corrections to keep the system gain in calibration (i.e., temperature independent) or within in some limited range that is acceptable. One such solution has been to control the temperature of the scintillation detector with a cooling apparatus, for example a thermo-electric cooler. Another solution has been to adjust the signal according to the temperature. For example, any one of a known radioactive source, a NaI(Tl)+ Am$^{241}$ light pulser, a light pulsed LED, or a lamp may be used as a reference for adjusting the signal, or the signal may be adjusted in accordance with the ratio of the yields of several components of the scintillation pulse.

In addition to the active systems above, there are also passive systems which use a thermistor to alter the gain of the PMT so as to effect temperature compensation. Passive systems have the advantage of not requiring the special hardware or software demanded by the active temperature compensation systems. These prior art thermistor-based passive systems, however, only provide temperature compensation over a limited range or in a limited amount which is not sufficient for many applications. Thus resort must be had in those situations to active temperature compensation techniques.

Each of the above active solutions to the problem of temperature variation requires additional equipment such as a cooling system or reference system. This significantly increases the cost of the scintillation detector. Additionally the use of a radioactive source may require a license for the radioactive material. The above passive solutions only provide a limited amount of compensation for variations due to temperature which is often insufficient or disadvantageously inaccurate. Thus, there is a need in the prior art to overcome the above problems associated with active and passive scintillation detectors.

SUMMARY OF THE INVENTION

The present invention provides a passive temperature compensation circuit and technique for scintillation detectors that improves temperature compensation performance. The invention enables the use of passive compensation where active temperature compensation scintillation detectors previously were required to obtain an acceptable level of temperature compensation. Moreover, benefit can be gained by combining the passive temperature compensation technique of the invention with other techniques, even active temperature compensation techniques, for more improved performance.

The present invention improves the precision and/or temperature range over which useful scintillation detection may be performed by compensating the scintillation detector for temperature dependency without significant additional costs associated with active compensation techniques. The compensation is achieved by incorporating one or more elements into the circuit associated with the photo-detector. The one or more elements offset the variation resultant from temperature dependency of the components of the scintillation detector. Specifically, the one or more elements provide offsets that vary at different rates at different temperatures. The different rates at different temperatures create an offset that more accurately matches and thus more accurately compensates for the temperature dependency. This increases the useful temperature range over which the scintillation detector may be utilized and/or enhances the precision of the scintillation detector.

According to one aspect of the invention, a temperature compensated scintillation detector comprises a scintillator, a photo-detector optically coupled to the scintillator and operative to convert photons emitted by the scintillator into an electrical signal, a first circuit for providing an offset to compensate the electrical signal for variations due to temperature, the offset varying with temperature, and a second circuit coupled to the first circuit for altering the amount of the offset when the temperature exceeds a first predetermined temperature.

In an embodiment, a third circuit is coupled to the first circuit for altering the amount of the offset when the temperature exceeds a second predetermined temperature.

In an embodiment, the second circuit includes a switching device for controlling the extent to which the second circuit functions to provide temperature compensation.

In an embodiment, the first circuit includes a thermistor, the second circuit includes a resistive element in series with a switching element, the photo-detector is a photomultiplier tube, and/or the second circuit includes a diode. Preferably, the diode is a zener diode or Schottky barrier diode.

In an embodiment, the second circuit may include a metal-insulator-metal (MIM) device.

According to another aspect of the invention, a temperature compensated scintillation detector comprises a scintillator, a photo-detector optically coupled to the scintillator and operative to convert photons emitted by the scintillator into a photo-detector electrical signal, and an associated photo-detector circuit electrically coupled to the photo-detector. The associated photo-detector circuit includes a primary temperature compensating circuit, a secondary temperature compensating circuit, and a switching device for selectively connecting the secondary temperature compensating circuit with the primary temperature compensating circuit.

In an embodiment, the primary temperature compensating circuit includes a thermistor, the secondary temperature compensating circuit includes a resistive element in series with a switching element, the photo-detector is a photomultiplier tube, and/or the secondary temperature compensating circuit includes a diode as the switching element.

According to a further aspect of the invention, a temperature compensated scintillation detector comprises a scintillator, a photo-detector optically coupled to the scintillator and operative to convert photons emitted by the scintillator into a photo-detector electrical signal, and associated photo-detector circuit electrically coupled to the photo-detector. The associated photo-detector circuit includes a temperature compensating circuit comprising a primary temperature compensating circuit operative over a first temperature range to provide temperature compensation, and a secondary temperature compensating circuit operative over a second temperature range extending outside the first temperature range to provide temperature compensation.

In an embodiment, the temperature compensating circuit includes a switching device for controlling the extent to which the secondary temperature compensating circuit functions to provide temperature compensation.

In an embodiment, the secondary temperature compensating circuit compensates over a second temperature range different from the first temperature range.

Further in accordance with the invention, a temperature compensated scintillation detector comprises a scintillator, a photomultiplier tube optically coupled to the scintillator and operative to convert photons emitted by the scintillator into an electrical signal, a resistive ladder electrically coupled to the photomultiplier tube, and a temperature compensation circuit that compensates for variations in the electrical signal due to temperature dependency in at least one of the scintillator and the photomultiplier tube. The temperature compensation circuit is electrically connected to the resistive ladder and includes a thermistor in parallel with a series circuit that includes a switching element and resistive element.

According to yet another aspect of the invention, a circuit for compensating a temperature dependent scintillation detector output comprises a temperature dependent scintillation detector output, a temperature dependent element for providing temperature compensation to a temperature dependent scintillation detector output over at least a first part and a second part of a temperature range, and an additional element for providing temperature compensation to the temperature dependent scintillation detector output over the second part of the temperature range. The compensation over the first part of the temperature range is provided at a different rate than the compensation over the second part of the temperature range. Preferably, the variation of the output due to temperature dependency is limited to ten percent, and more preferably is limited to six percent.

The invention also provides methods of providing temperature compensation in a scintillation detector that are inherent in the aforedescribed scintillation detectors.

Further in accordance with the invention, a particular method provides temperature compensation in a scintillation detector including a scintillator, a photo-detector optically coupled to the scintillator and operative to convert photons emitted by the scintillator into a photo-detector electrical signal, and an associated photo-detector circuit electrically coupled to the photo-detector. The method comprises including a first circuit in the associated light sensing circuit to compensate for temperature variation over a first temperature range, and including a second circuit in the associated light sensing circuit to compensate for temperature variation over a second temperature range.

The invention also provides for a temperature compensating circuit for a scintillation detector including a photomultiplier tube and associated voltage ladder, wherein a temperature dependent resistive element or circuit is substituted for the ladder resistor between the anode and adjacent dynode of the photomultiplier tube, between the cathode and adjacent dynode of the photomultiplier tube, or between any two adjacent dynodes of the photomultiplier tube. Such circuit has provides for increased gain as temperature goes up.

The foregoing and other features of the invention are herein fully described and particularly pointed out in the claims. The following description and the annexed drawings setting forth in detail certain illustrative embodiments of the invention. These embodiments being indicative, however, of but a few of the various ways in which the principles of the invention may be employed. Other object, advantages and novel features of the invention will become apparent from the following detailed description of the invention when considered in conjunction with the drawings.

DETAILED DESCRIPTION

Figure 1:
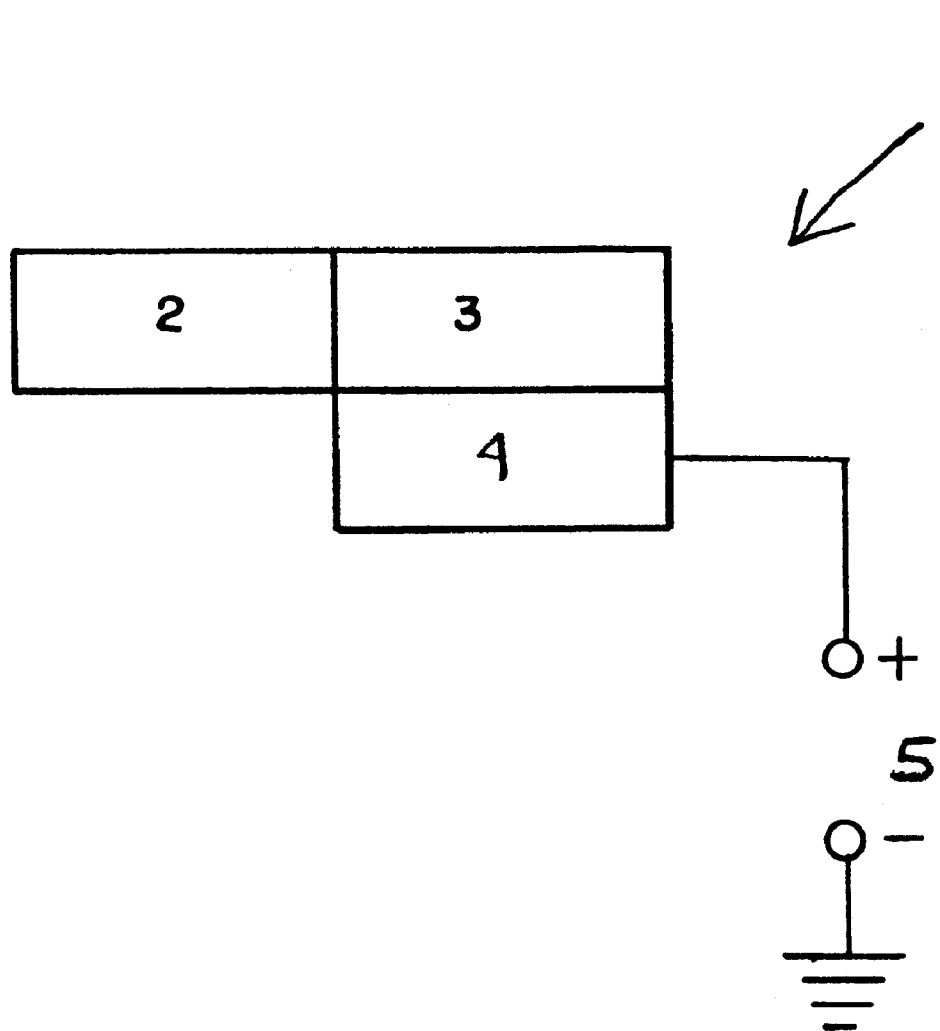
FIG. 1 is a diagrammatic illustration of a scintillation detector.

Referring now in detail to the drawings, in FIG. 1 a scintillation detector is designated generally by reference numeral 1. The scintillation detector 1 includes a scintillator 2, a photo-detector 3 and an associated circuit 4 that outputs an electrical signal 5 that varies as a function of the amount of light produced by the scintillator 2. In the following examples, the photo-detector 3 is a photomultiplier, specifically a ten stage photomultiplier. Alternatively, the photo-detector 3 could be a photomultiplier with a different number of stages, gas readout devices, TMAE devices, etc. The scintillator 2 may be any kind of scintillator made of any material appropriate for the intended use, including plastic scintillators, inorganic scintillators and crystal scintillators. Crystal scintillators include NaI(Tl), CsI(Na), CsI(Tl), BGO, BC-438, as well as others.

Figure 2:
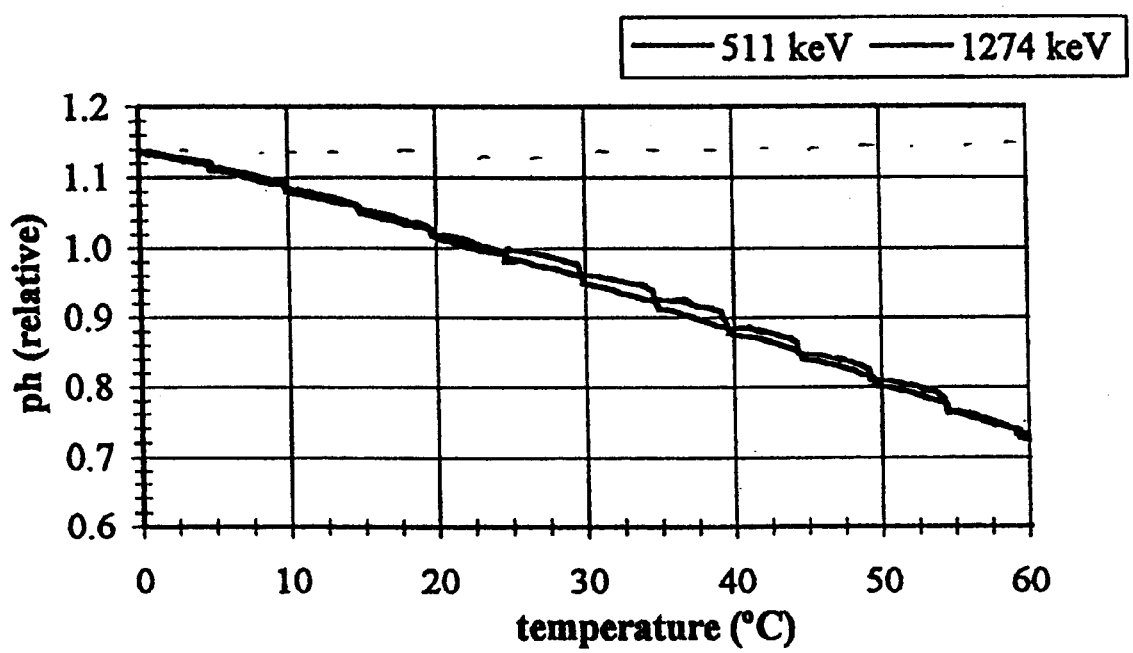
FIG. 2 is a graph of a prior art scintillation detector output without any temperature compensation.

FIG. 2 is a graph of a prior art scintillation detector output without any temperature compensation (ph (relative) is the pulse height normalized to 25° C. The prior art scintillation detector provides a charge output signal that indicates the amount of light detected. The charge output signal is converted to a voltage signal which is plotted in FIG. 2 against ambient temperature for constant incident radiation. As the temperature increases from 0° C. to 60° C., the voltage signal decreases by nearly half. Temperature dependence of this magnitude limits the usefulness of scintillation detectors lacking temperature compensation. To correct for the temperature dependency, a thermistor has been used in the manner shown in FIG. 3. The prior art, passively compensated scintillation detector circuit includes resistors 11–23, potentiometer 25, thermistor 26 and capacitors 28–32, which are connected to the photomultiplier 33. The circuit has a charge output signal at 34 and a high voltage input at 35, and the PMT has a cathode 36, anode 37 and dynodes 38. Thermistor 26, such as a 250 k ohm thermistor, provides limited temperature compensation to the signal 34 as the temperature of the scintillation detector changes. The thermistor 26 has a negative nonlinear thermal dependency while the remainder of the scintillation detector has a negative nearly linear thermal dependency. The thermal coefficient of the thermistor 26 may be matched to the thermal coefficient of the remaining components of the scintillation detector 1 so as to reduce or eliminate the temperature dependency of the scintillation detector, but only over a relatively narrow temperature range.

Figure 3:
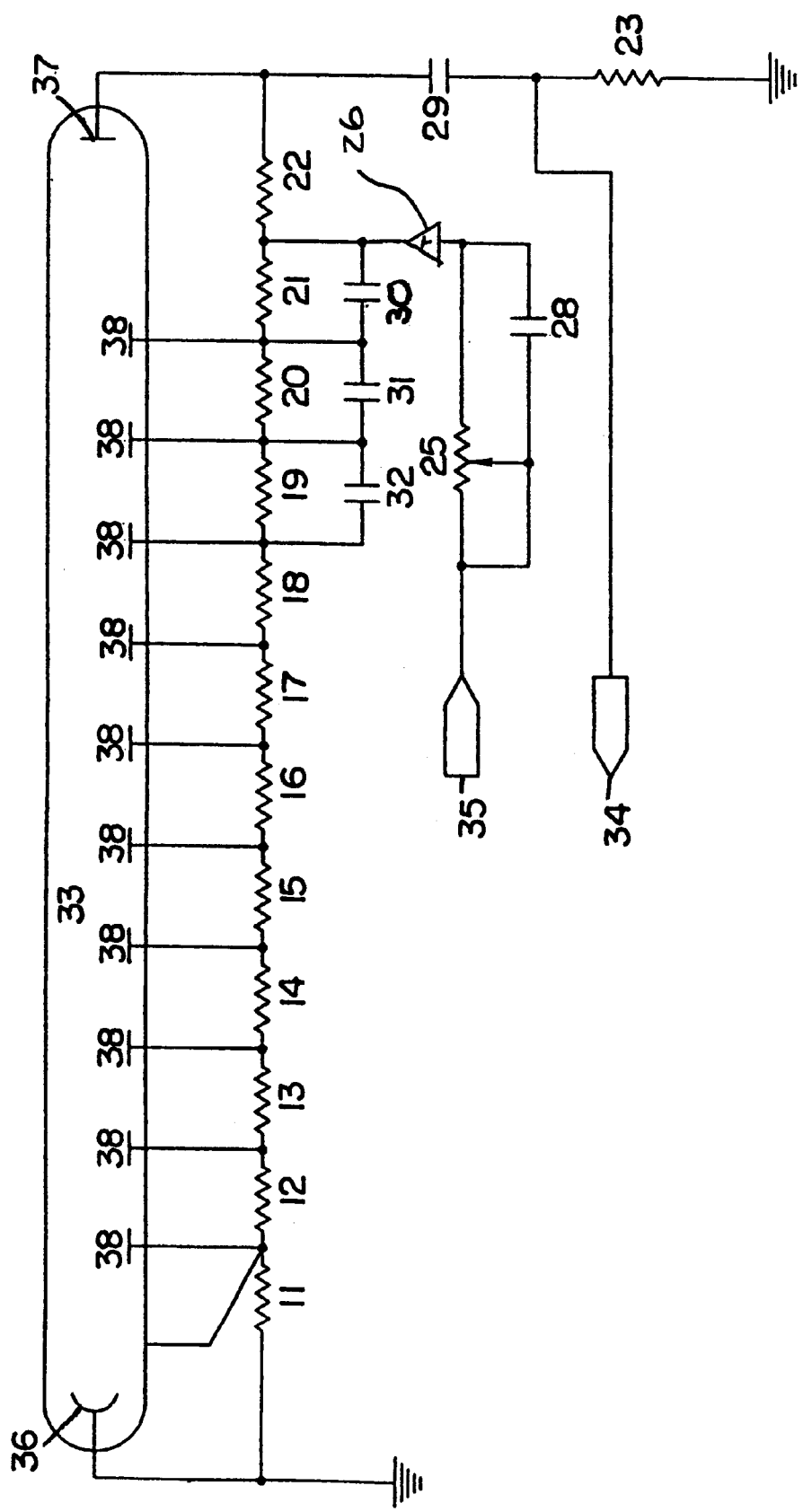
FIG. 3 is a schematic of a prior art temperature compensating scintillation detector circuit.
Figure 4:
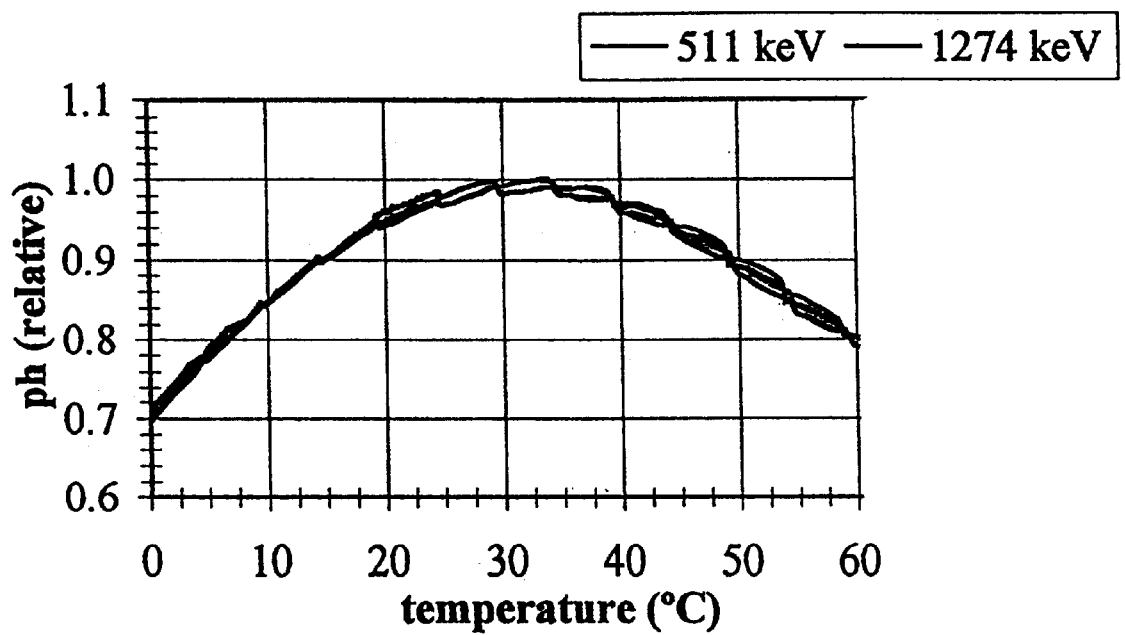
FIG. 4 is a graph of a prior art scintillation detector output with a thermistor for temperature compensation.

FIG. 4 is a exemplary graph of the voltage signal output of the scintillation detector versus temperature for the prior art thermistor compensated detector circuit of FIG. 3. As can be seen, the relative voltage signal varies less than in the example of FIG. 2. However, this change is still significant with approximately a 30% variation between the extremes and the maximum. The temperature dependence limits the usefulness of such prior art thermistor-compensated scintillation detectors.

Because of the temperature dependence of the above passive prior art scintillation detector, those skilled in the art have elected to control the temperature of a scintillation detector or use active devices having a known radioactive source, a NaI(Tl)+Am$^{241}$ light pulser, a light pulsed LED, or a lamp may be used as a reference for adjusting the signal corresponding to the detected scintillation, or the signal may be adjusted in accordance with the ratio of the yields of several components of the scintillation pulse. Each of these scintillation detectors require extensive and expensive additional equipment.

Figure 5:
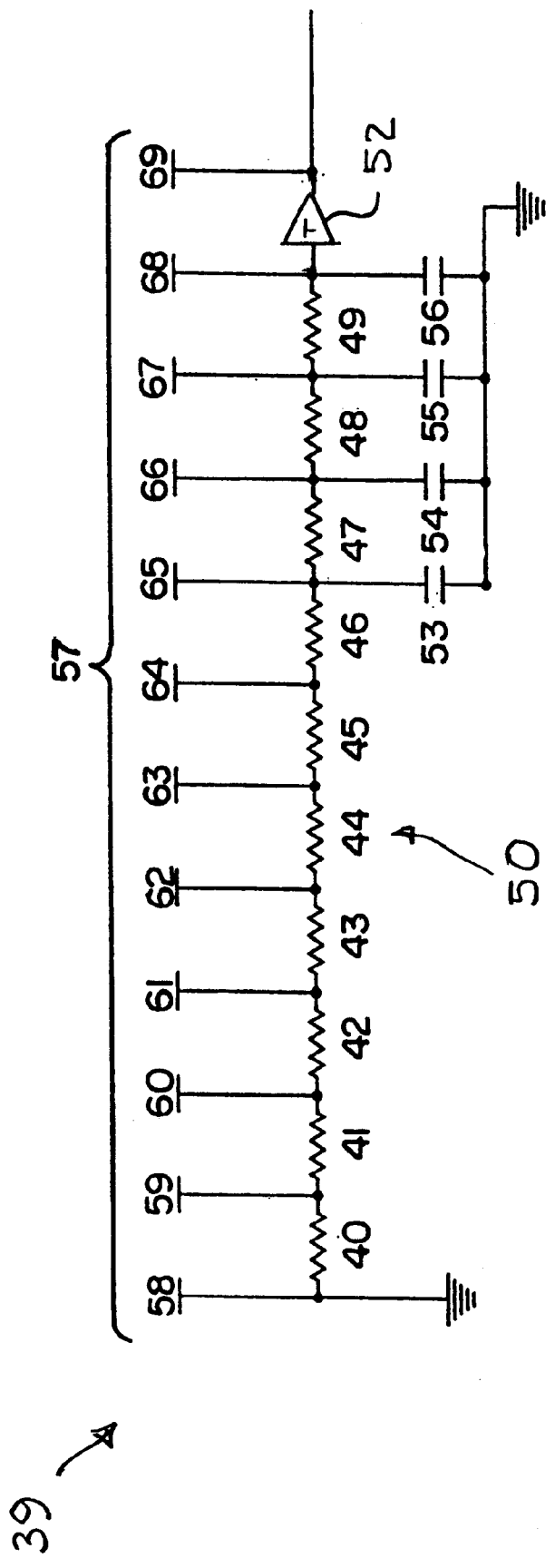
FIG. 5 is a schematic of a temperature compensating scintillation detector circuit according to the invention.

FIG. 5 shows a new passively temperature compensated scintillation detector circuit 39. The circuit 39 includes resistors 40–49 of a voltage ladder 50, temperature dependent resistive element 52 and capacitors 53–56, which are connected to the photomultiplier tube 57. The photomultiplier tube connects to the circuit at cathode connection point 58, anode connection point 69, and dynode connection points 59–68. The temperature dependent resistive element, e.g. a thermistor (or circuit including a thermistor), is substituted for the ladder resistor between the anode 69 and adjacent voltage ladder dynode 68 of the photomultiplier tube 57. Alternatively, the thermistor 52 may be substituted for the voltage ladder resistor between the cathode and adjacent dynode of the photomultiplier tube, or for the resistor between any two adjacent dynodes of the photomultiplier tube. The circuit 39 provides for increased gain as temperature goes up, providing for some extension of the useful range of the temperature compensated circuit, as may be desired for some applications. However, the effective range of temperature compensation is still relatively narrow, although improved.

The affect the thermistor 26, 52 in the prior art circuit of FIG. 3 or the inventive circuit of FIG. 5 has upon the output 4 of the scintillation detector 1 can be controlled. First, the value of the thermistor 26, 52 can be selected to be anywhere between a smaller value to a larger value. The larger values create a smoother and flatter response at higher temperatures but degrade the lower temperature response. In contrast, smaller values for the thermistor 26, 52 create a smoother and flatter response at lower temperatures but degrade the higher temperature response.

The aforesaid problem shared by the prior art circuit of FIG. 3 or the inventive circuit of FIG. 5 can be resolved without having to resort to the above active devices and temperature controls. This reduces the amount of equipment required to construct a scintillation detector systems having an increased working range, as well as reducing their cost.

Figure 6:
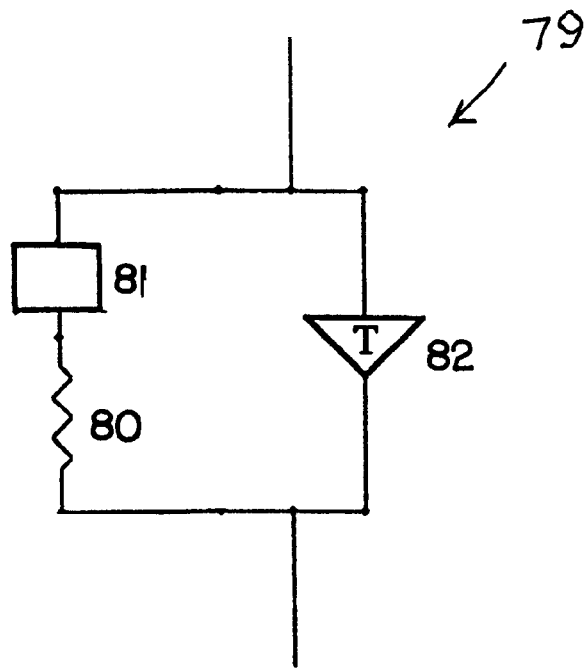
FIG. 6 is a schematic of a temperature compensating circuit device according to the invention.
Figure 7:
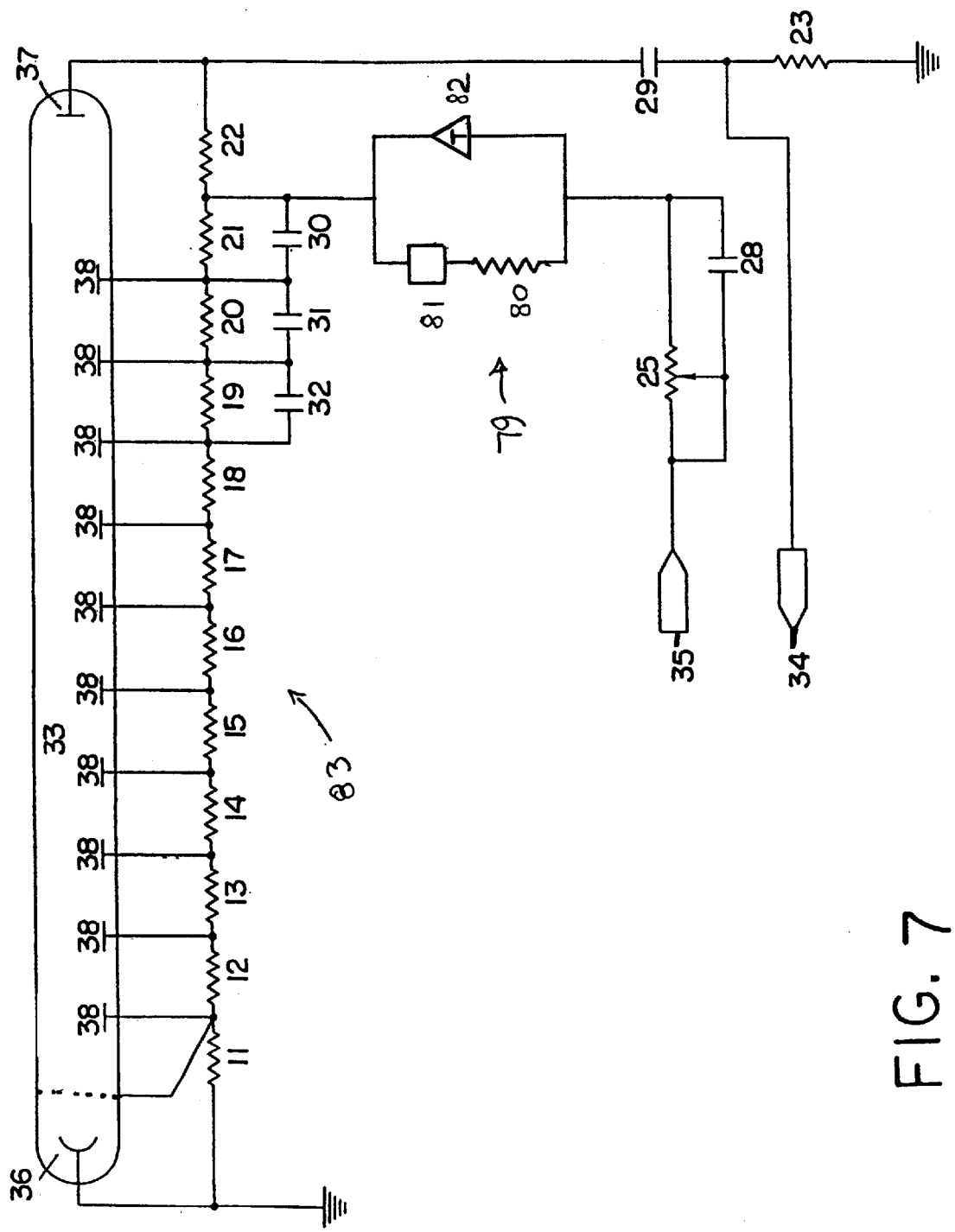
FIG. 7 is a schematic of a temperature compensating scintillation detector circuit using the temperature compensating circuit device of FIG. 6.

FIG. 6 shows a temperature compensation circuit 79 (also herein referred to as a circuit device) that may be employed advantageously in the general detector arrangement of FIG. 1. The compensation circuit device 79 includes a primary circuit including a thermistor 82, and a secondary circuit including a switching device 81 and a resistor 80. The compensation circuit device is inserted into the circuit associated with a light detector such as a photomultiplier tube or the like, such as in a circuit like that shown in FIG. 3. Specifically and as seen in FIG. 7, the temperature compensation circuit is inserted between the resistive voltage ladder 83 (or other voltage divider) and the power supply (it is preferable that a potentiometer 25 and capacitor 28 be between the compensation circuit 79 and the power supply). Alternatively, the temperature compensation circuit may be substituted for one of the resistors of the voltage ladder, such as between adjacent dynodes of the photomultiplier tube, between the cathode and the adjacent dynode, or between the anode and the adjacent dynode as seen in FIG. 8.

Figure 8:
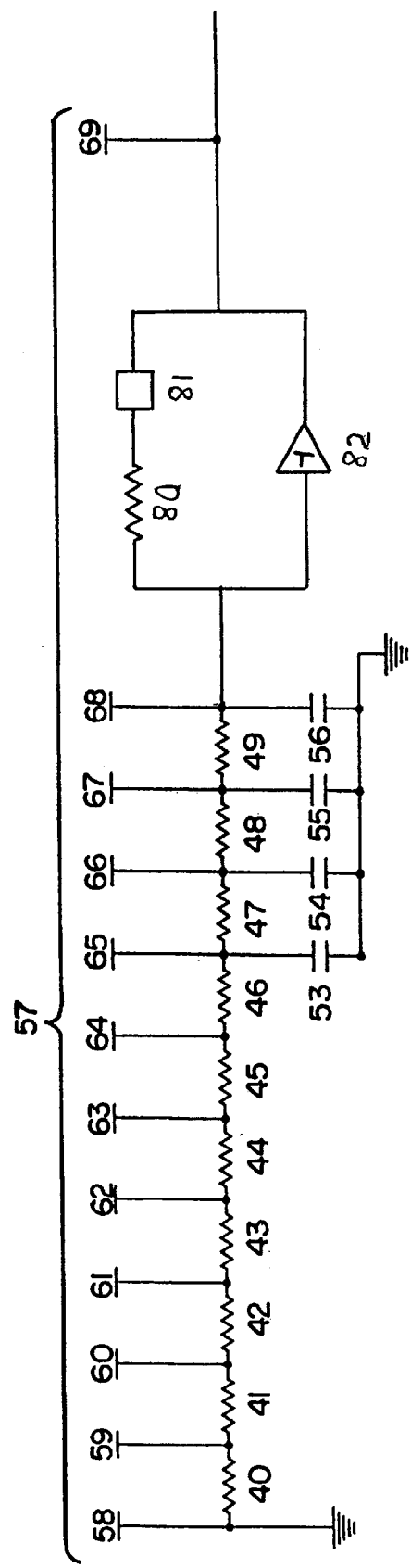
FIG. 8 is a schematic of another temperature compensating scintillation detector circuit using the temperature compensating circuit device of FIG. 6 according to the invention.

In FIG. 8, the voltage at anode connection point 69 is the potential of the high voltage source plus the output signal. The switching element can be a diode, such as a zener diode or a Schottky barrier diode, or a metal-insulator-metal (MIM) device, or the like. As noted, the compensation circuit device 79 may be switched for any one of the resistors between any of the dynodes 41–49.

The present invention works equally well with both positive and negative voltage ladders.

In operation and with reference to FIG. 7, the thermistor 82 and the resistor 80 and switching element 81 act in combination so as to provide compensation to the signal at 34 as the temperature of the scintillation detector 1 changes. The switching element 81 can be a diode, such as a zener diode or a Schottky barrier diode, or a metal-insulator-metal (MIM) device, or and the like. The thermal coefficient of the thermistor 82 should be of the same sign as the remainder of the temperature dependent elements of the scintillation detector. For most scintillation detectors, especially those that are photomultiplier tubes, this coefficient will typically be negative and thus a negative temperature coefficient (NTC) thermistor would be used. While it may not be possible to exactly match the thermal coefficient of any of a thermistor to be thermal coefficient of the remaining components of the scintillation detector over the full design range of the scintillation detector, it usually is possible to match the thermal coefficient of the thermistor over a limited temperature range to that of the remaining components of the scintillation detector.

The operational temperature range is expanded and/or the amount of the compensation is increased by the series combination of the resistor 80 and switching element 81, both of which are placed in parallel with the thermistor 82. The thermistor 82 provides temperature compensation for a certain temperature range while the resistor 80 and switching element 81 cause a different temperature compensation to be applied over a different temperature range. This is possible because when the temperature of the device reaches a certain temperature, the voltage across the switching element 81 is sufficient to enable the switching element 81, thereby altering the amount of the offset through the coupling of the resistor 80 in parallel with thermistor 82.

With a thermistor-zener diode-resistor (TZR) circuit, low temperature response of the scintillation detector is improved (or prevented from worsening) when the value of the thermistor 82 is increased to get a smoother and flatter response at a higher temperature. The zener diode compensates for the large change in resistance of the thermistor as the temperature is increased. The zener diode functions to limit and keep the voltage difference from increasing as the resistance of the thermistor is increasing. More current must pass through the zener diode 81 instead of the thermistor 82 to keep the voltage drop across the zener diode constant. With less current in the thermistor, the voltage drop is less. The resistor 80 modifies the effect of the zener diode and helps to match it to the thermistor. The smaller the zener diode rating, the less the deviation at the low temperature end of the working range. However, too small a value can depress the high temperature end. The value of the resistor in series with the zener diode helps to match the temperature profile of the thermistor.

Accordingly, more accurate temperature compensation is achieved because the temperature dependency is compensated by an offset which varies at multiple rates rather than at a single rate.

For scintillation detector circuits using a single cable positive high-voltage, preferably the compensation circuit device 79, specifically the TZR circuit, is placed between two dynodes of the photomultiplier tube or between the last dynode and the anode, the latter being shown in FIG. 8. This avoids the load resistance from becoming a function temperature and interfering with capacitive decoupling of the system.

The foregoing substantially reduces the degree of variation over a wide temperature range when compared with the prior art passive scintillation detectors. For example, an uncompensated scintillation detector might have a 40% change from 0° C. to 60° C. and a thermistor compensated scintillation detector might have a 30% change. In contrast, the use of the compensation circuit 79 as above described can limit the variance to under about 10%, and preferably under about 6%. This is an improvement of 567% (i.e. less than a sixth of the variation) over the uncompensated scintillation detector of the prior art and an improvement of 400% (i.e. a fifth of the variation) over the passively compensated scintillation detectors of the prior art. In another example with a larger operating temperate range, a scintillation detector might have a 50% change from 0° C. to 70° C. while the circuit of FIG. 7 enables a change of no more than about 7.5%. This is an improvement of 567% (i.e. less than a sixth of the variation) over the uncompensated scintillation detector of the prior art. For smaller operating temperate ranges, the scintillation detector of the present invention will have an even smaller variation over the operating temperature range. For example, a scintillation detector including the circuit device 79 according to the invention may experience a variation of only 3.5% over an operating temperature range of 25° C. to 60° C.

Figure 6A:
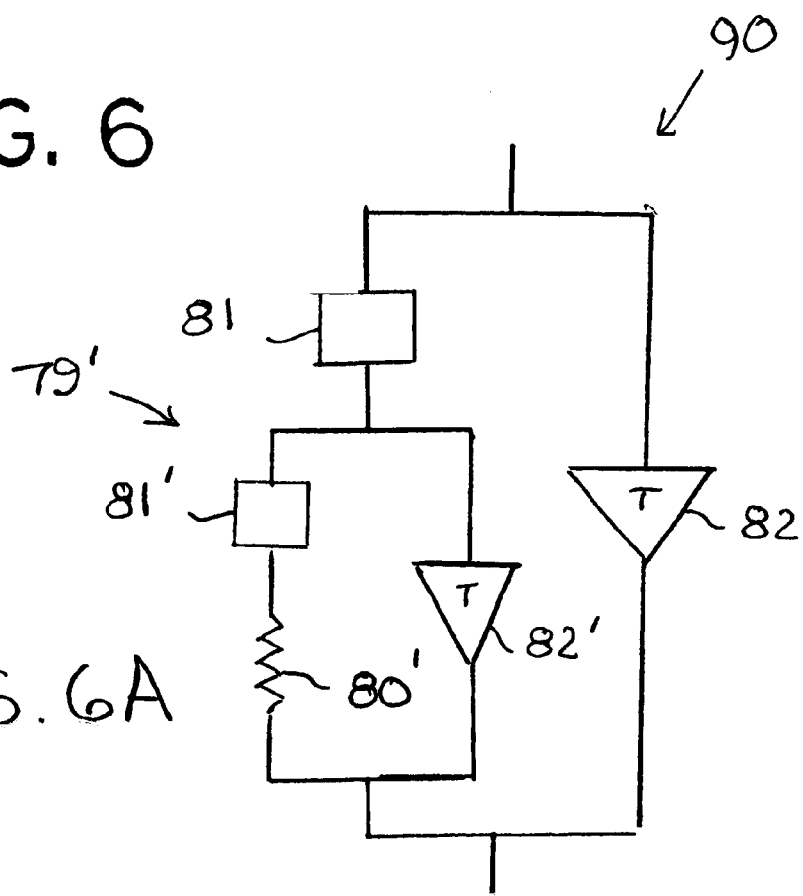
FIG. 6A is a schematic of a cascaded temperature compensating circuit device according to the invention.

Additional switching elements and resistors may be placed in parallel with the thermistor to further reduce the temperature dependency of the output signal. As seen in FIG. 6A, a temperature compensation circuit device 79' may be substituted for the resistor 80 of FIG. 6 to further expand the useful temperature range of a scintillation detector or improve the performance over a given range. In operation of the resultant cascade arrangement shown in FIG. 6A, the thermistor 82 provides temperature compensation for a certain temperature range. When the temperature of the device reaches a certain level, the voltage across the switching element 81 is sufficient to enable the switching element 81, thereby coupling the device 79' in parallel with the thermistor 82. Now, the effective resistance of the modified compensation circuit 90 will arise from the two thermistors 82 and 82' connected in parallel, until the temperature reaches the switch point enabling the switching element 81'. When the switching element 81' is enabled, the resistor 80' is coupled in parallel with thermistor 82'. Thus, rate of temperature offset is further varied. The values of the switching device, thermistors and resistor may be selected to match the temperature dependency characteristic of the other scintillation detector components to provide for improved temperature compensation over a wider range.

Figure 9:
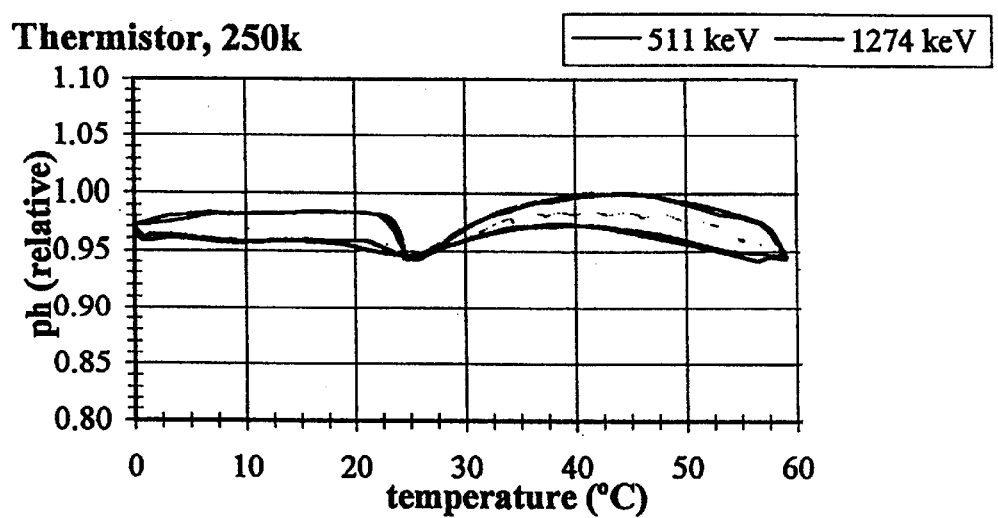
FIG. 9 is a graph of a scintillation detector output with temperature compensation according to the invention.

FIG. 9 is a graph of the voltage signal which indicates the amount of light detected versus temperature for a thermistor-zener-resistor compensated scintillation detector circuit according to FIG. 7. A 250 k ohm thermistor, a 30 V zener diode and 150 k ohm resistor make up the compensation circuit. As can be easily discerned the variation in the signal output with temperature is minimal, only being about 6%.

Figure 10:
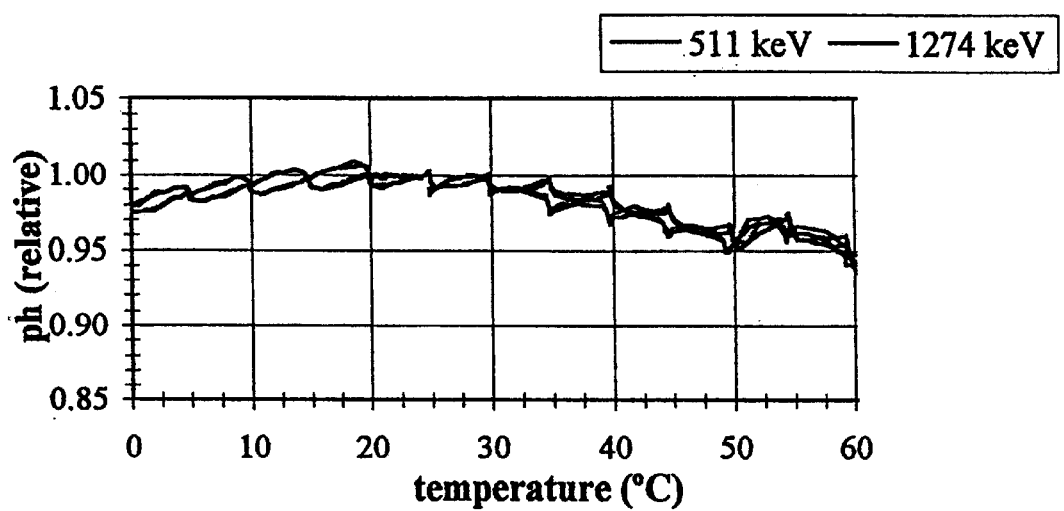
FIG. 10 is a graph of a scintillation detector output with temperature compensation according to the invention.

FIG. 10 is a graph of the voltage signal which indicates the amount of light detected versus temperature for a thermistor zener resistor compensated scintillation detector circuit according to FIG. 8. A 450 k ohm thermistor, a 37 V zener diode and the 150 k ohm resistor made up the compensation circuit. As can be easily discerned the variation in the signal output with temperature is also minimal, only being about 5%.

The switching element also affects the performance of the temperature compensation circuit. For example, when using a zener diode, a smaller zener rating results in less deviation at lower temperatures but may depress the output signal at higher temperatures. The other switching devices have similar effects.

While the examples of the present invention use a 0° C. to 60° C., a 25° C. to 60° C. and a 0° C. to 70° C. temperature range, a larger or smaller range may be compensated. If a smaller range is compensated, the variation is made smaller while a larger temperature range will have a larger variation. Additionally, the present invention may be applied to high temperature (e.g., 80° C.) scintillation detectors which may undergo several hundred degrees of temperature variation.

The present invention may be applied to newly fabricated scintillation detectors or may be used to retrofit older scintillation detectors to improve their performance. The present invention has utility for use in scintillation detectors useful where cost is a concern as well as temperature variation of output signal. The compensation technique and circuit may have still other applications including those relating to devices other than scintillation detectors.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A temperature compensated scintillation detector comprising:
   a scintillator;
   a photo-detector optically coupled to the scintillator and operative to convert photons emitted by the scintillator into an electrical signal;
   a first circuit for providing an offset to compensate the electrical signal for variations due to temperature, the offset varying with temperature; and
   a second circuit coupled to the first circuit for altering the amount of the offset when the temperature exceeds a first predetermined temperature.

2. A scintillation detector according to claim 1, further comprising a third circuit coupled to the first circuit for altering the amount of the offset when the temperature exceeds a second predetermined temperature.

3. A scintillation detector according to claim 1, wherein the temperature variation of the offset above the first predetermined temperature is different from the variation below the first predetermined temperature.

4. A scintillation detector according to claim 1, wherein the second circuit includes a switching device for controlling the extent to which the second circuit functions to provide temperature compensation.

5. A scintillation detector according to claim 1, wherein the first circuit includes a thermistor.

6. A scintillation detector according to claim 1, wherein the second circuit includes a resistive element in series with a switching element.

7. A scintillation detector according to claim 1, wherein the photo-detector is a photomultiplier tube.

8. A scintillation detector according to claim 1, wherein the second circuit includes a diode.

9. A scintillation detector according to claim 8, wherein the diode is a zener diode.

10. A scintillation detector according to claim 9, wherein the diode is a Schottky barrier diode.

11. A scintillation detector according to claim 1, wherein the second circuit includes an MIM.

12. A temperature compensated scintillation detector comprising:
    a scintillator;
    a photo-detector optically coupled to the scintillator and operative to convert photons emitted by the scintillator into a photo-detector electrical signal;
    an associated photo-detector circuit electrically coupled to the photo-detector;
    the associated photo-detector circuit including a primary temperature compensating circuit, a secondary temperature compensating circuit, and a switching device for selectively varying the connection between the secondary temperature compensating circuit and the primary temperature compensating circuit.

13. A scintillation detector according to claim 12, wherein the primary temperature compensating circuit includes a thermistor.

14. A scintillation detector according to claim 12, wherein the secondary temperature compensating circuit includes a resistive element in series with a switching element.

15. A scintillation detector according to claim 12, wherein the photo-detector is a photomultiplier tube.

16. A scintillation detector according to claim 12, wherein the secondary temperature compensating circuit includes a diode.

17. A scintillation detector according to claim 16, wherein the diode is a zener diode.

18. A scintillation detector according to claim 17, wherein the diode is a Schottky barrier diode.

19. A scintillation detector according to claim 12, wherein the secondary temperature compensating circuit includes an MIM.

20. A scintillation detector according to claim 12, further comprising a third temperature compensating circuit, and wherein the primary temperature compensating circuit includes a thermistor and the third temperature compensating circuit includes a thermistor.

21. A scintillation detector according to claim 20, wherein the thermistor of the primary temperature compensating circuit and the thermistor of the secondary temperature compensating circuit are in parallel.

22. A temperature compensated scintillation detector comprising:
    a scintillator;
    a photo-detector optically coupled to the scintillator and operative to convert photons emitted by the scintillator into a photo-detector electrical signal;
    associated photo-detector circuit electrically coupled to the photo-detector;
    the associated photo-detector circuit including a temperature compensating circuit comprising a primary temperature compensating circuit operative over a first temperature range to provide temperature compensation, and a secondary temperature compensating circuit operative over a second temperature range extending outside the first temperature range to provide temperature compensation.

23. A detector according to claim 22, wherein the temperature compensating circuit includes a switching device for controlling the extent to which the secondary temperature compensating circuit functions to provide temperature compensation.

24. A scintillation detector according to claim 22, wherein the secondary temperature compensating circuit compensates over a second temperature range different from the first temperature range.

25. A method of providing temperature compensation to a scintillation detector that includes a scintillator, a photo-detector optically coupled to the scintillator and operative to convert photons emitted by the scintillator into a photo-detector electrical signal, and an associated photo-detector circuit electrically coupled to the photo-detector, the method comprising:

including a first circuit in the associated photo-detector circuit to compensate for temperature variation over a first temperature range; and including a second circuit in the associated photo-detector circuit to compensate for temperature variation over a second temperature range.

26. The method of claim 25, wherein the first circuit includes a thermistor, and the second circuit includes a switching element and a resistive element.

27. The method of claim 26, wherein the switching element includes at least one of a diode, a zener diode, a Schottky barrier diode and an MIM.

28. The method of claim 26, further comprising a third circuit in the associated photo-detector circuit to compensate for temperature variation over a third temperature range.

29. The method of claim 26, wherein the first and second temperature ranges are substantially the same and the second circuit assists the first circuit in compensating for temperature variation.

30. The method of claim 26, wherein the first and second temperature ranges are different.

31. A temperature compensated scintillation detector comprising:

a scintillator;

a photomultiplier tube optically coupled to the scintillator and operative to convert photons emitted by the scintillator into an electrical signal;

a resistive ladder electrically coupled to the photomultiplier tube; and a temperature compensation circuit that compensates for variations in the electrical signal due to temperature dependency in at least one of the scintillator and the photomultiplier tube, the temperature compensation circuit electrically connected to the resistive ladder and including a thermistor in parallel with a series circuit, the series circuit including a switching element and resistive element.

32. A scintillation detector according to claim 31, further comprising a voltage source electrically coupled to the temperature compensation circuit.

33. A scintillation detector according to claim 31, wherein the switching element includes a zener diode.

34. A circuit for compensating a temperature dependent scintillation detector output comprising:

a temperature dependent scintillation detector output;

a temperature dependent element for providing temperature compensation to a temperature dependent scintillation detector output over at least a first part and a second part of a temperature range; and an additional element for providing temperature compensation to the temperature dependent scintillation detector output over the second part of the temperature range;

wherein the compensation over the first part of the temperature range is provided at a different rate than the compensation over the second part of the temperature range.

35. A scintillation detector according to claim 34, wherein the variation of the output due to temperature dependency is limited to ten percent.

36. A scintillation detector according to claim 34, wherein the variation of the output due to temperature dependency is limited to six percent.

37. A temperature compensating circuit for a scintillation detector including a photomultiplier tube having an anode, cathode and dynodes, a voltage divider ladder connected to said anode, cathode and dynodes, the voltage divider ladder including a temperature dependent resistive element connected between at least one of the anode and adjacent dynode of the photomultiplier tube, between the cathode and adjacent dynode of the photomultiplier tube, and between any two adjacent dynodes of the photomultiplier tube.

* * * * *